Patented Aug. 20, 1946

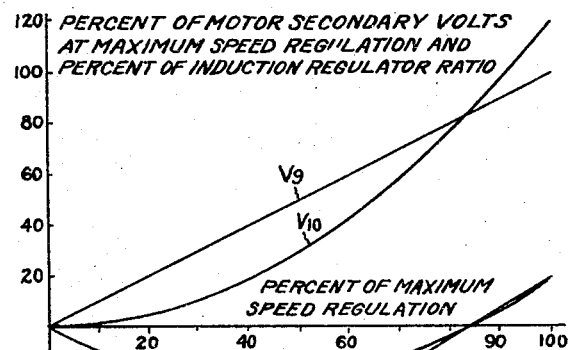
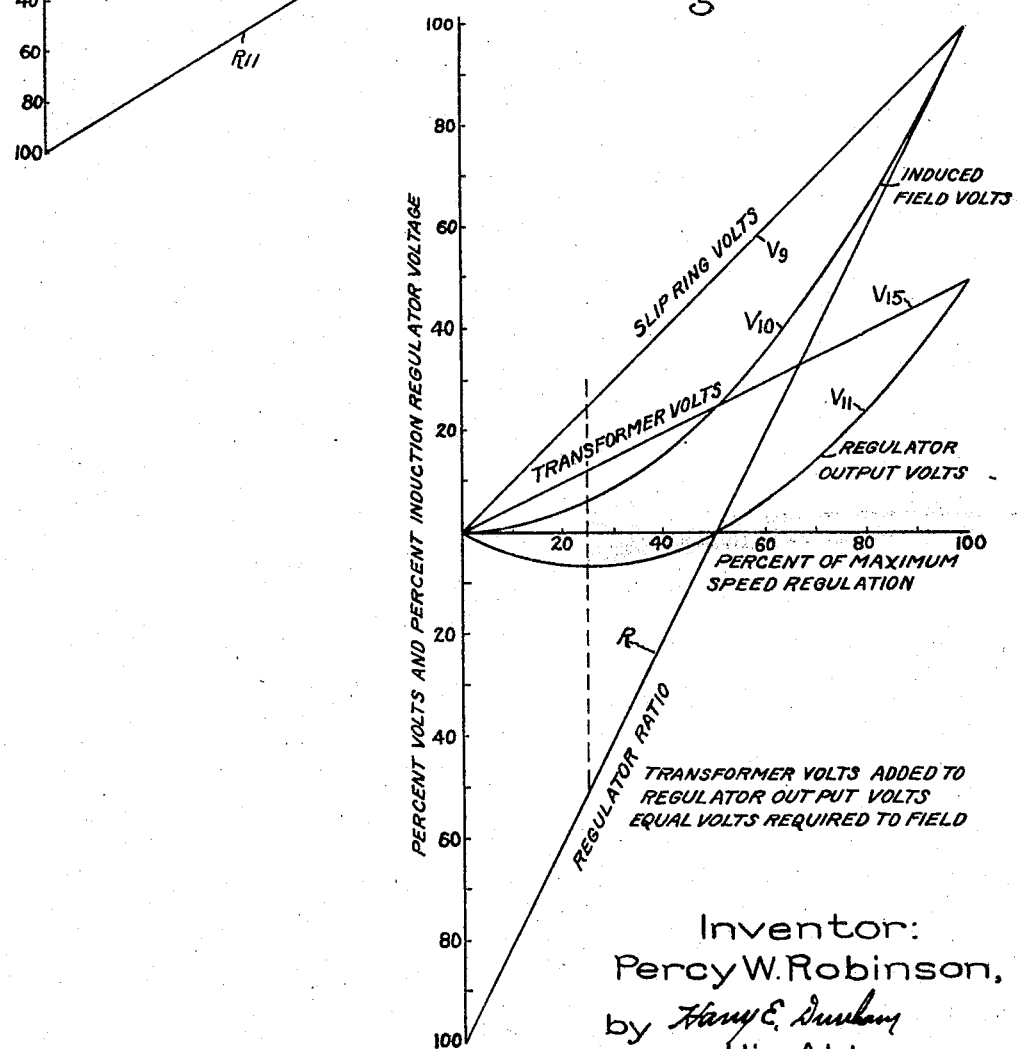

2,406,255

UNITED STATES PATENT OFFICE 2,406,255

INDUCTION MOTOR CONTROL SYSTEM

Percy W. Robinson, Scotia, N. Y., assignor to General Electric Company, a corporation of New York Application March 24, 1945, Serial No. 584,559

5 Claims. (Cl. 172—274)

My invention relates to a system and apparatus for controlling the speed of induction motors above and below synchronism such that the power factor will be high, the operation stable, and the regulating apparatus will be relatively simple in construction and operation, with low maintenance and long life. My invention may be considered as an improvement over the induction motor control scheme of United States patent to Hull No. 1,306,594, June 10, 1919, in that in general it replaces one of the commutator machines and the adjustable reversing rheostats of Figs. 8 and 9 of the Hull patent with induction regulators, thereby simplifying the control, reducing the maintenance cost of the control apparatus, and greatly reducing resistance losses therein.

Figure 1:
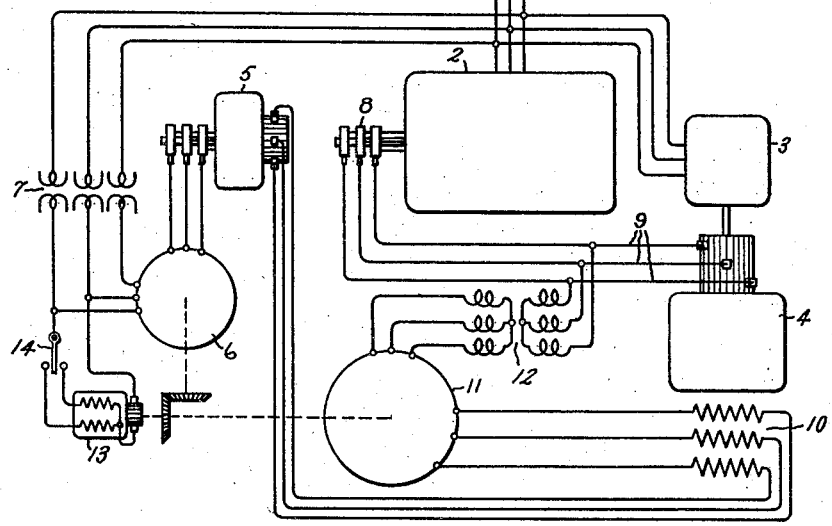
Figure 2:
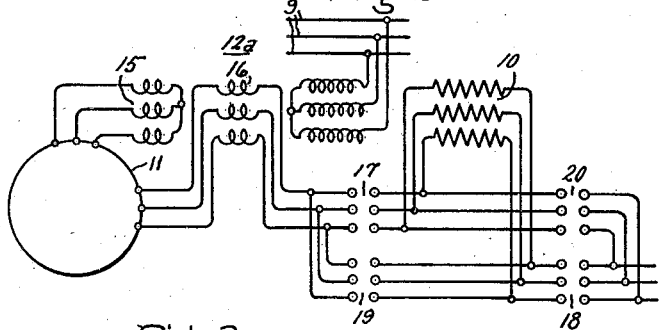
Figure 3:
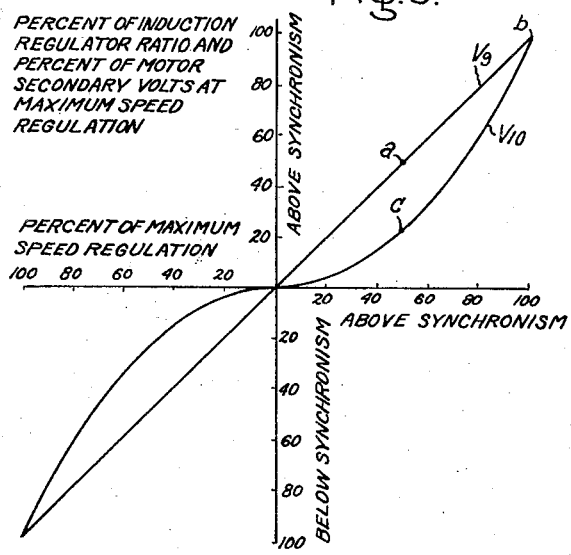

The features of my invention which are believed to be novel and patentable will be pointed out in the claims appended hereto. For a better understanding of my invention, reference is made in the following description to the accompanying drawings in which Fig. 1 represents a preferred embodiment of my invention in which no reversing switches are needed in operating through synchronous speed. Fig. 2 shows modifications that may be incorporated into the system of Fig. 1 to reduce the size of the main induction regulator employed. Fig. 3 shows by means of curves the percentage voltage adjustment of certain parts of the regulating apparatus at various speeds where the main induction regulator voltage reverses at synchronous speed and no field reversing switch is used. Fig. 5 shows percentage excitation voltage speed curves characteristic of the apparatus as modified, as represented in Fig. 2; and Fig. 4 shows corresponding percentage excitation voltage speed curves such as would be obtained with the transformer arrangement of Fig. 1 but using a reversing switch as in Fig. 2.

Referring now to Fig. 1, I represents a source of polyphase power supply for the stator primary winding of main induction motor 2, a smaller motor 3 for driving a compensated commutator type speed regulating machine 4 with interpoles and for an ohmic drop exciter 5, the supply to the latter being through an induction regulator represented at 6 and a transformer 7, if needed. The ohmic drop exciter 5 is driven with the main induction motor and converts line frequency to the slip frequency of the main induction motor. The rotor secondary winding of the induction motor is connected through slip rings 8 and connections 9 to the polyphase commutator brushes of regulating machine 4. The exciting winding 10 of machine 4 is supplied at slip frequency jointly by the ohmic drop exciter 5 and a second induction regulator 11 energized through a transformer 12 from the secondary voltage and frequency of main motor 2. The ohmic drop exciter supplies the excitation of field winding 10 necessary for power factor correction and resistance drop in the excitation circuits, and the desired variation in this part of the excitation for different speeds of the induction motor is taken care of by the induction regulator 6. The speed control excitation voltage is supplied to winding 10 from the transformer 12 and the induction regulator 11. The induction regulators 6 and 11 are of a type which vary the voltage with a substantially fixed phase angle between input and output and may be of the type described in British Patent No. 287,684 of 1928. The excitation requirements of the induction regulators 6 and 11 are so related that they may be adjusted by a common reversible pilot motor represented at 13 having a control and reversing switch 14. The transformer 12 is desirable to segregate the induction motor secondary from the circuit of field 10 at and near synchronous speed, when the ohmic drop exciter voltage is small.

In the arrangement of Fig. 1 if the induction regulator 11 has zero transformer ratio at synchronous speed of the induction motor, it may be used in place of a reversing switch for reversing the field winding 10 when going from below to above synchronism and vice versa.

In the curve of Fig. 3 the abscissas represent per cent of maximum speed regulation above and below synchronism, while the ordinates represent per cent of induction regulator transformer ratio and per cent of motor secondary volts at maximum speed regulation above and below synchronism. The secondary voltage of motor 2 varies linearly with speed as represented by the straight line $V_9$. If the ohmic drop excitation voltage be neglected, the voltage which it is desired to apply to the exciting winding 10 for various speeds, and hence, for various slip frequencies varies with the square of the slip frequency above and below synchronism, and hence, can be represented by the parabolic curves $V_{10}$, Fig. 3. This curve also represents the output voltage required of regulator 11.

If the insulating transformer 12 has a 1-to-1 ratio, the straight line $V_9$ also represents the per cent of maximum voltage ratio of the induction regulator 11. For example, at 50 per cent of maximum speed above or below synchronism, the induction motor secondary voltage applied to regulator 11 (point $a$ on curve $V_9$) is 50 per cent of the induction motor secondary voltage at full speed regulation (point $b$ on curve $V_9$). The output-to-input voltage ratio of regulator 11 is 50 per cent of maximum ratio so that the output voltage of 11 is 50% of 50% = 25% of the induction motor secondary at 100 per cent speed regulation or at point $c$ on curve $V_{10}$. This voltage matches the induced field voltage as the flux of machine 4 at 50 per cent of maximum secondary voltage, $V_9$, is 50 per cent of the maximum flux and the secondary frequency is 50 per cent of maximum. The induced field voltage of machine 4 is proportional to the product of flux and frequency which for this case is 25 per cent of maximum. At synchronous speed the secondary frequency of motor 2 is zero; hence, transformer 12 has no effect which, at synchronous speed, has the desirable effect of isolating the secondary of machine 2 from field winding 10. The voltage ratios of regulators 6 and 11 are also zero unless power factor correction of motor 2 is required. In the latter case regulator 6 may have unequal effective stator and rotor turns in order to deliver quadrature voltage at its mid-position through ohmic drop exciter 5. This excitation is in the nature of direct current, and current of a similar nature flows in the secondary of the main induction machine. Hence, the motor 2 may be operated through synchronism or held at synchronous speed with stability.

While passing through synchronism, the transformer ratio of regulators 6 and 11 pass through zero and reverse. This reversal accomplishes the same result as has heretofore been accomplished by reversing the field winding 10 by a switching arrangement such as is shown in Fig. 2, and as a result, with the arrangement thus far described for Fig. 1 the reversing switch is not required for passing through synchronism, and hence, the motor may be operated through synchronism in smooth, steady, and uninterrupted manner while carrying load. This arrangement requires a relatively larger capacity regulator at 11 than do other arrangements to be described.

Consider, now, the arrangement of Fig. 1 as provided with reversing contactors for the winding 10 of machine 4 such as is represented in Fig. 2 at 17, 18, 19 and 20 in order that the motor 2 may be operated through synchronism without reversing the transformation ratio of the regulator 11 at synchronous speed. In one case the contacts at 17 and 18 are closed while those at 19 and 20 are open, and for reversing, the contacts at 17 and 18 are opened and those at 19 and 20 closed. Using such reversing contactors, it would be good economy to wind the field winding 10 of machine 4 with a number of turns such that the induced shunt field voltage is equal to the secondary voltage of the induction motor 2 at about 83 per cent of maximum speed regulation above or below synchronism. The relation of induction motor secondary voltage to the voltage in the field circuit would be as shown by the curves of Fig. 4. In Fig. 4 the ohmic drop voltage is disregarded for the sake of simplicity, and the curves for operation only one way from synchronous speed are represented. Curve $V_9$ represents the secondary voltage of the induction motor; curve $V_{10}$ the voltage required to balance the induced voltage in the field 10 of the machine 4. Curve $V_{11}$ is the voltage required to be impressed upon the field 10 from the induction regulator 11; and curve $R_{11}$ represents the per cent of maximum voltage ratio for which the induction regulator 11 is set. With this arrangement the regulator 11 has a maximum voltage output of 21 per cent compared with a maximum of 50 per cent for the arrangement represented by the curves of Fig. 5. It is noted from Fig. 4 that the transformation ratio of the regulator 11 becomes zero and reverses at about 83 per cent of maximum speed regulation at which point the induced field voltage of machine 4 matches the secondary voltage of the induction motor.

The transformation ratio of the transformer which supplies the induction regulator 11 may be altered to meet different requirements, and in Fig. 2, I have shown the fixed ratio transformer 12a as having two secondary windings 15 and 16, the former supplying the regulator 11 and the latter in series with the secondary of the regulator output. Such an arrangement is useful to replace worn-out contact-making regulating equipment such as is described in the previously mentioned Hull patent, while utilizing an existing commutator machine at 4 without change in its field winding 10. I will assume that the stepdown transformation ratio of the transformer 12a is 2 to 1 between its primary and secondary windings. Then the voltage relations at various speeds could be as represented in the curves of Fig. 5, where the voltage supplied for ohmic drop is neglected. Curve $V_9$ represents per cent of maximum induction motor secondary voltage plotted against per cent of maximum speed regulation one way from synchronism. Curve $V_{10}$ represents the percentage induced volts at different speeds in field 10. Curve $V_{15}$ represents the percentage voltage contributed by winding 16 of transformer 12a at different speeds. Curve $V_{11}$ represents the percentage voltage output of regulator 11 and curve $R$ the percentage regulator ratio, which is 100 per cent at the synchronous and maximum speed regulating points. Here the transformer voltage curve $V_{15}$ added to the regulator voltage $V_{11}$ equals the induced field voltage $V_{10}$ of machine 4.

The curves may be further explained by considering the condition at, say, 25 per cent maximum speed regulation. Here the induction motor secondary voltage is 25 per cent of the value for maximum regulation and this voltage is applied to the primary of the 2-to-1 stepdown transformer 12a. This gives 12½ per cent of the maximum voltage $V_9$ applied to the primary of regulator 11. As the regulator ratio $R$ for this speed is that for 50 per cent ratio in the reverse sense, its output voltage $V_{10}$ in the reversed direction is 50% of 12½% = 6¼% of maximum secondary voltage $V_9$. The winding 16 of transformer 12a adds a voltage which is ½ of 25% of $V_9$ max. = 12½%. Hence, the voltage applied to field winding 10 by the transformer 12a and regulator 11 is the algebraic sum of $V_{11}$ and $V_{15}= -6¼\% + 12½\% = 6¼\%$ of $V_9$ max.

which matches the induced field voltage $V_{10}$ at this 25 per cent of maximum speed regulation point because at 25 per cent of maximum speed regulation both the flux and frequency (proportional to induction motor slip) of machine 4 are 25 per cent of maximum, and the induced voltage is proportional to their product, or, 25% of 25% = 6.25%. These same relations hold throughout the speed regulating range as shown in Fig. 5.

In all cases the speed is controlled by joint and simultaneous control of the two induction regulators 6 and 11. The ratio adjusting mechanism for the two regulators is so connected together as regards regulator positions as to obtain the relationship desired in any particular case.

What I claim as new and desire to secure by Letters Patent of the United States is:

1. A speed control system for induction motors comprising in combination with a source of supply, a wound secondary induction motor supplied therefrom, a commutator regulating machine concatenated with the secondary winding of the induction motor, said commutator machine having an exciting field winding, a transformer and an induction regulator connected in series relation between the secondary of said induction machine and said field winding for supplying speed control excitation, an induction regulator and an ohmic drop exciter connected in series relation between said source of supply and said field winding for supplying ohmic drop excitation, said induction regulators being of a type which vary their voltage transformation ratio at a substantially fixed phase angle, and means for simultaneously adjusting the ratio of said induction regulators for controlling the speed of said induction motor.

2. A speed control system for induction motors comprising in combination with a source of supply, a wound secondary induction motor supplied therefrom, a commutator regulating machine concatenated with the secondary winding of the induction motor, said commutator machine having an exciting field winding, an induction regulator connected in series relation between the secondary of said induction motor and exciting winding for supplying speed control excitation, an induction regulator and ohmic drop exciter connected in series relation between said source of supply and exciting winding for supplying ohmic drop excitation, said induction regulators being of a type which vary their voltage transformation ratio at substantially a fixed phase angle, means for varying the transformation ratio of said induction regulators for varying the speed of said induction motor through synchronism, and means for isolating the secondary winding of the induction motor from the exciting winding of said commutator machine and ohmic drop exciter at the synchronous speed of the induction motor.

3. A speed control system for induction motors comprising in combination with a source of supply, a wound secondary induction motor having its primary supplied from said source, a commutator regulating machine concatenated with the wound secondary winding of said induction motor, a transformer and an induction voltage regulator connected in series relation between the secondary of said induction motor and exciting field winding for supplying speed control excitation to said regulating machine, other means for supplying ohmic drop excitation to the regulating machine, said induction regulator being of a type which varies its voltage transformation ratio at a substantially fixed phase angle, and means for varying the transformation ratio of said induction regulator to vary the speed of said motor, said induction regulator having a zero transformation ratio adjustment at the synchronous speed of said induction motor and reverses the direction of its transformation ratio when the apparatus is adjusted to operate the motor through synchronous speed whereby switching mechanism for reversing the direction of the excitation of said regulating machine when operating through synchronism is rendered unnecessary.

4. A speed control system for induction motors comprising in combination with a source of supply, a wound secondary induction motor having its primary supplied from said source, a commutator regulating machine concatenated with the secondary winding of said motor, an exciting winding for said regulating machine, a transformer and an induction voltage regulator connected in series relation between the secondary of the induction motor and exciting winding for supplying speed control excitation, other means for supplying ohmic drop excitation to said exciting winding, said induction voltage regulator being of a type which changes its voltage transformation ratio at a substantially fixed phase angle, means for simultaneously adjusting the transformation ratio of said induction regulator and the value of the ohmic drop excitation for regulating the speed of said induction motor from above to below synchronism or vice versa, said regulating machine being designed to have an induced field voltage equal to the secondary voltage of the induction motor at approximately 83 per cent of maximum speed regulation of the induction motor above and below synchronism, the adjustment of the transformation ratio of the induction regulator being arranged such that at such approximate 83 per cent speed regulating points the transformation ratio of the induction regulator is zero and reverses when going from above to below such speed points and has a maximum voltage transformation ratio at the synchronous speed of the induction motor.

5. A speed control system for induction motors comprising a wound secondary induction motor, a source of supply therefor, a commutator regulating machine concatenated with the secondary of said motor, an exciting winding for said regulating machine, a transformer and an induction voltage regulator connected in series relation between the secondary of said induction machine and said exciting winding for supplying speed control excitation, said transformer having a stepdown ratio with a secondary winding supplying the induction regulator and a secondary winding connected in series with the output of said induction regulator, a second induction voltage regulator and an ohmic drop exciter connected in series relation between said source of supply and exciting winding for supplying ohmic drop excitation for said control system, said regulators being of a type having a substantially fixed phase angle of transformation, means for adjusting both induction voltage regulators simultaneously to control the speed of said induction motor, and means for reversing the direction of exciting current through said exciting winding when operating through synchronous speed.

PERCY W. ROBINSON.